US008687302B2

(12) United States Patent
Hoque et al.

(10) Patent No.: US 8,687,302 B2
(45) Date of Patent: Apr. 1, 2014

(54) REFERENCE VOLTAGE CIRCUIT FOR ADAPTIVE POWER SUPPLY

(75) Inventors: Anamul Hoque, Lakeville, MN (US); Cameron C. Rabe, Inver Grove Heights, MN (US)

(73) Assignee: LSI Corporation, San Jose, CA (US)

( * ) Notice: Subject to any disclaimer, the term of this patent is extended or adjusted under 35 U.S.C. 154(b) by 169 days.

(21) Appl. No.: 13/367,473

(22) Filed: Feb. 7, 2012

(65) Prior Publication Data

US 2013/0201578 A1  Aug. 8, 2013

(51) Int. Cl.
*G11B 5/09* (2006.01)

(52) U.S. Cl.
USPC .............................. 360/46; 360/75; 323/315

(58) Field of Classification Search
USPC ................... 360/75, 46, 67, 51, 69; 327/537; 323/315, 313
See application file for complete search history.

(56) References Cited

U.S. PATENT DOCUMENTS

| | | | |
|---|---|---|---|
| 4,260,946 A | 4/1981 | Wheatley, Jr. | |
| 4,298,835 A | 11/1981 | Rowe | |
| 4,477,737 A | 10/1984 | Ulmer et al. | |
| 5,864,225 A | 1/1999 | Bryson | |
| 6,184,743 B1 | 2/2001 | Swart | |
| 6,288,525 B1 | 9/2001 | Fischer | |
| 6,791,396 B2 | 9/2004 | Shor et al. | |
| 7,119,527 B2 * | 10/2006 | Fernald | 323/315 |
| 7,202,654 B1 * | 4/2007 | Dadashev et al. | 323/315 |
| 7,253,598 B1 | 8/2007 | Doyle et al. | |
| 7,301,322 B2 * | 11/2007 | Choi | 323/315 |
| 7,372,244 B2 * | 5/2008 | Marinca | 323/316 |
| 7,649,330 B2 * | 1/2010 | Yamashita et al. | 318/560 |
| 7,777,466 B2 | 8/2010 | Crippa et al. | |
| 7,872,825 B2 | 1/2011 | Sanghvi | |
| 2005/0184797 A1 | 8/2005 | Choi | |
| 2006/0001412 A1 | 1/2006 | Fernald | |
| 2007/0069711 A1 | 3/2007 | Dadashev et al. | |
| 2007/0170906 A1 | 7/2007 | Marinca | |

OTHER PUBLICATIONS

M. Ueda et al., "A 3.3V ASIC for Mixed Voltage Applications With Shut Down Mode," IEEE Custom Integrated Circuits Conference, May 1993, pp. 25.5.1-25.5.4.

B. Cline et al., "The AimLow LDO: A 130nm 1.5V High-Performance Linear Voltage Regulator," pp. 1-5.

G.W. Den Besten et al., "Embedded 5 V-to-3.3 V Voltage Regulator for Supplying Digital IC's in 3.3 V CMOS Technology," IEEE Journal of Solid-State Circuits, Jul. 1998, pp. 956-962, vol. 33, No. 7.

\* cited by examiner

*Primary Examiner* — Ali Neyzari
(74) *Attorney, Agent, or Firm* — Ryan, Mason & Lewis, LLP (57) ABSTRACT

Interface circuitry of a storage device or other type of processing device comprises at least one data path, and an adaptive power supply configured to provide a variable supply voltage to the data path. The adaptive power supply comprises a reference voltage circuit having a plurality of field effect transistors collectively configured to provide a variable reference voltage, with different ones of the field effect transistors being biased into different operating regions. For example, a first subset of the field effect transistors may each be biased into a linear region such that the variable reference voltage tracks variations in on-resistance of one or more corresponding field effect transistors of the data path, and a second subset of the field effect transistors may each be biased into a saturation region such that the variable reference voltage tracks variations in threshold voltage of the corresponding field effect transistors of the data path.

21 Claims, 6 Drawing Sheets

FIG. 7 ial embodiments of the invention are
REFERENCE VOLTAGE CIRCUIT FOR ADAPTIVE POWER SUPPLY

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

HDDs often include a system-on-chip (SOC) to process data from a computer or other processing device into a suitable form to be written to the storage disk, and to transform signal waveforms read back from the storage disk into data for delivery to the computer. The SOC has extensive digital circuitry and has typically utilized advanced complementary metal-oxide-semiconductor (CMOS) technologies to meet cost and performance objectives. The HDD also generally includes a preamplifier that interfaces the SOC to the read/write head used to read data from and write data to the storage disk.

The preamplifier typically comprises write drivers that include bipolar transistors and associated MOS degeneration circuitry. Each of the write drivers may also have an associated data path that includes one or more high-speed CMOS inverter chains. The data paths generally need to pass very narrow pulse widths in order to provide the desired overshoot current for a given write pulse. For example, a data path may be required to provide a 130 picosecond pulse width over process, voltage and temperature (PVT) variations, where the 130 picosecond pulse width is utilized for write pulse overshoot. However, it can be difficult to support these narrow pulse width requirements using conventional voltage regulators that have fixed reference voltage circuits.

Attempts to address this issue in conventional practice include increasing the size of the inverters of the CMOS inverter chains, but such an approach unduly increases the circuit area and power consumption of the preamplifier.

SUMMARY

Illustrative embodiments of the invention provide interface circuitry that may be part of a preamplifier in a disk-based storage device such as an HDD, or part of another type of processing device. The interface circuitry includes an adaptive power supply for supplying a variable voltage to high-speed CMOS circuitry of a datapath, such as a high side or low side data path associated with a write driver in the preamplifier. The adaptive power supply includes a reference voltage circuit that dynamically tracks both on-resistance and threshold voltage of field effect transistors in the CMOS circuitry, thereby allowing the write drivers to more easily pass very narrow pulse widths, such as the above-noted 130 picosecond pulse widths that may be utilized for write pulse overshoot.

In one embodiment, interface circuitry of a storage device or other type of processing device comprises at least one data path, and an adaptive power supply configured to provide a variable supply voltage to the data path. The adaptive power supply comprises a reference voltage circuit having a plurality of field effect transistors collectively configured to provide a variable reference voltage, with different ones of the field effect transistors being biased into different operating regions. For example, a first subset of the field effect transistors may each be biased into a linear region such that the variable reference voltage tracks variations in on-resistance of one or more corresponding field effect transistors of the data path, and a second subset of the field effect transistors may each be biased into a saturation region such that the variable reference voltage tracks variations in threshold voltage of the corresponding field effect transistors of the data path.

One or more of the illustrative embodiments provide significant improvements in disk-based storage devices or other processing devices that incorporate preamplifiers. For example, the above-noted enhanced ability to pass narrow pulse widths may be achieved in a given embodiment without the need for any increase in the size of the CMOS inverters utilized in the datapath, and thereby without significantly increasing the required circuit area or power consumption of the preamplifier. Also, under nominal operating conditions the variable voltage provided by the adaptive power supply can be reduced relative to that provided in conventional arrangements using fixed reference voltage circuits, resulting in a reduction in nominal power consumption relative to the conventional arrangements.

DETAILED DESCRIPTION

Embodiments of the invention will be illustrated herein in conjunction with exemplary disk-based storage devices, interface circuitry and associated adaptive power supplies and reference voltage circuits. It should be understood, however, that these and other embodiments of the invention are more generally applicable to any processing device application in which improved high-speed signal processing over PVT variations is desired. Additional embodiments may be implemented using components other than those specifically shown and described in conjunction with the illustrative embodiments.

Figure 1:
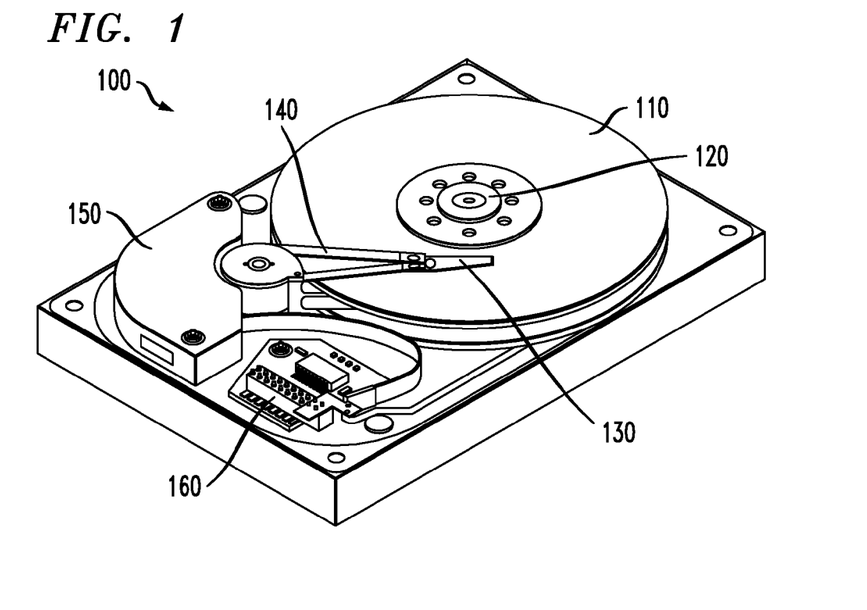
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials capable of storing data in the form of magnetization states. The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. The position of the read/write head over the storage surface of the storage disk 110 is controlled by an electromagnetic actuator 150. A connector 160 is used to connect the storage device 100 to a host computer or other related processing device. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1.

The term "control circuitry" as used herein is therefore intended to be broadly construed so as to encompass, by way of example and without limitation, drive electronics, signal processing electronics, and associated processing and memory circuitry, and may further encompass other elements utilized to control positioning of a read/write head relative to a storage surface of a storage disk in a storage device.

It is to be appreciated that, although FIG. 1 shows an embodiment of the invention with only a single storage disk 110, read/write head 130, and positioning arm 140, this is by way of illustrative example only, and alternative embodiments of the invention may comprise multiple instances of these and other drive components. For example, one such alternative embodiment may comprise multiple storage disks attached to the same spindle so all such disks rotate at the same speed, and multiple read/write heads and associated positioning arms coupled to one or more actuators. A given read/write head as that term is broadly utilized herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. The interface circuitry arrangements disclosed herein are more generally applicable without limitation to any storage device or processing device application in which it is desirable to provide enhanced performance in processing signals having narrow pulse widths. Those skilled in the art will therefore recognize that a wide variety of other storage device and processing device configurations may be used in implementing embodiments of the invention.

Figure 2:
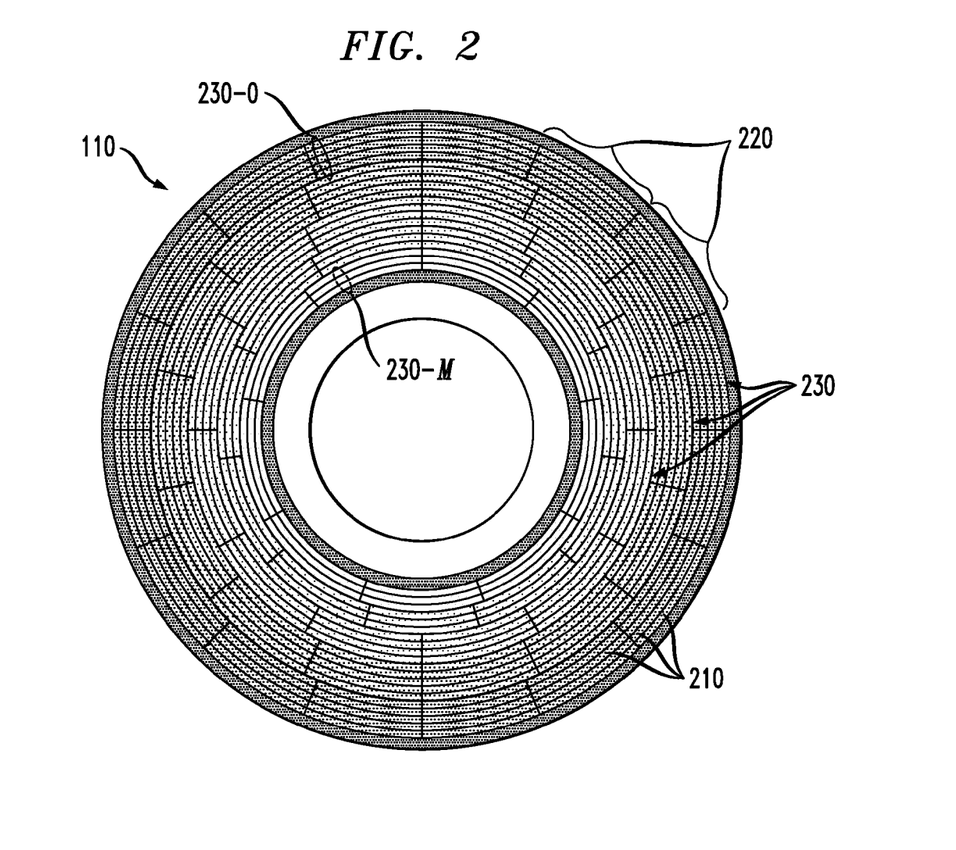
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval.

The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Since each outer zone stores more data than the inner zones, the read/write head need not be moved as frequently to read a given amount of data when accessing data in the outer zones. Data can therefore be transferred at a higher rate to or from tracks in the outer zones than to or from tracks in the inner zones.

Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two.

As one example embodiment, provided by way of illustration only, the outermost annular zone may have a data transfer rate of approximately 2.3 Gigabits per second (Gb/s), while the innermost annular zone has a data transfer rate of approximately 1.0 Gb/s. In such an implementation, the HDD may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The particular data transfer rates and other features referred to in the embodiment described above are presented for purposes of illustration only, and should not be construed as limiting in any way. A wide variety of other data transfer rates and storage disk configurations may be used in other embodiments.

An embodiment of the invention will be described below in conjunction with FIGS. 3 to 5, in which the storage device 100 of FIG. 1 is configured to implement interface circuitry comprising an adaptive power supply. The interface circuitry in this embodiment is implemented in a preamplifier of the storage device 100.

Figure 3:
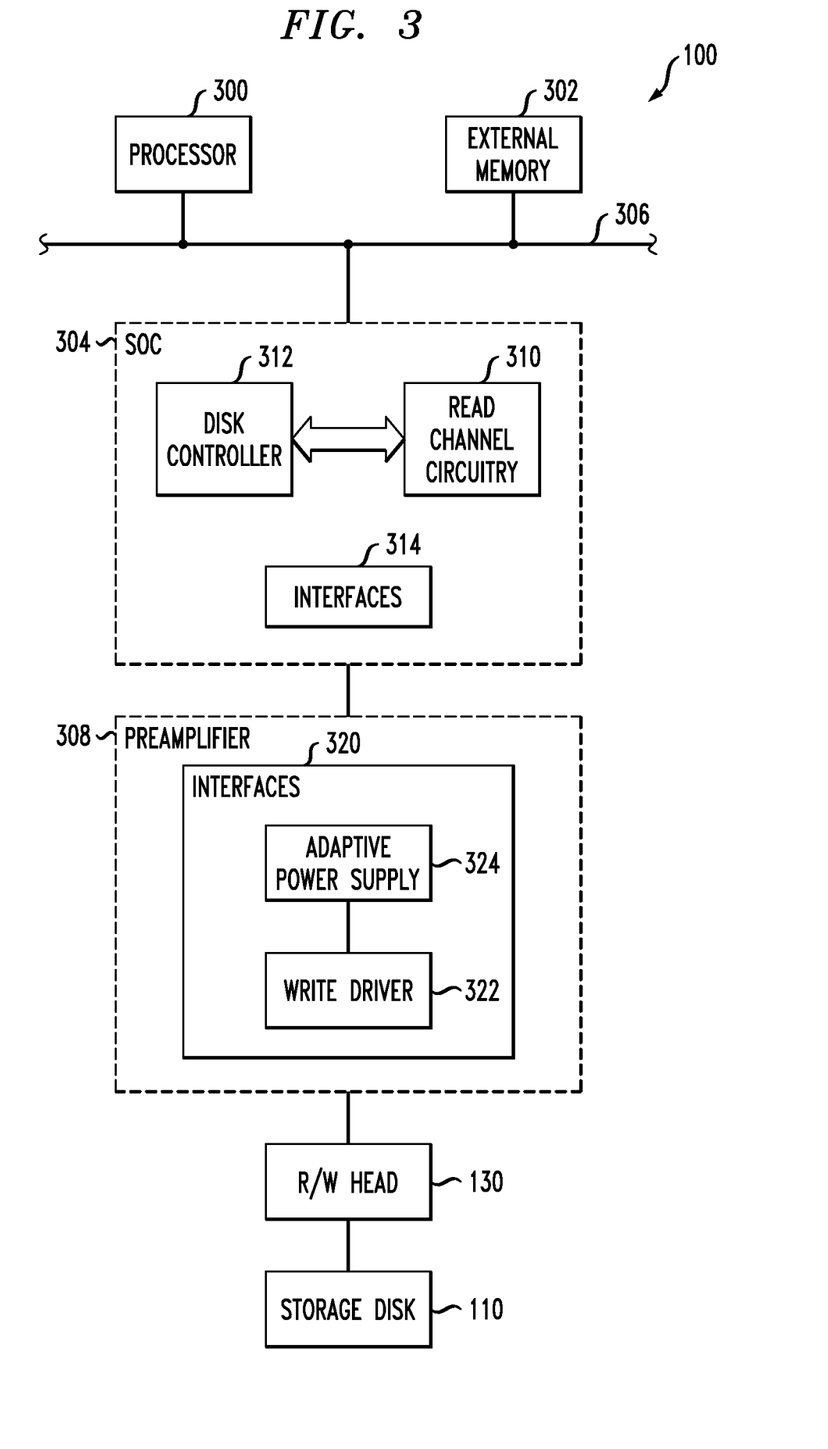
FIG. 3 is a block diagram of a portion of the storage device of FIG. 1 including an exemplary preamplifier comprising a write driver and an associated adaptive power supply.

FIG. 3 shows a portion of the storage device 100 of FIG. 1 in greater detail. In this view, the storage device 100 comprises a processor 300, a memory 302 and an SOC 304, which communicate over a bus 306. The storage device further comprises a preamplifier 308 providing an interface between the SOC 304 and the read/write head 130. The memory 302 is an external memory relative to the SOC 304 and other components of the storage device 100, but is nonetheless internal to that storage device. The SOC 304 in the present embodiment includes read channel circuitry 310 and a disk controller 312, and directs the operation of the read/write head 130 in reading data from and writing data to the storage disk 110.

The bus 306 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus may also be used to support communications between other system components, such as between the SOC 304 and the preamplifier 308. It should be understood that AXI interconnects are not required, and that a wide variety of other types of bus configurations may be used in embodiments of the invention.

The processor 300, memory 302, SOC 304 and preamplifier 308 may be viewed as collectively comprising one possible example of "control circuitry" as that term is utilized herein. Numerous alternative arrangements of control circuitry may be used in other embodiments, and such arrangements may include only a subset of the components 300, 302, 304 and 308, or portions of one or more of these components. For example, the SOC 304 itself may be viewed as an example of "control circuitry."

The control circuitry of the storage device 100 as shown in FIG. 3 is therefore generally configured to process data received from and supplied to the read/write head 130 and to control positioning of the read/write head 130 relative to the storage disk 110.

In the present embodiment, certain operations of the SOC 304 may be directed by processor 300, which executes code stored in external memory 302. For example, the processor 300 may be configured to execute code stored in the memory 302 for performing read and write operations in the storage device 100. Thus, at least a portion of the control functionality of the storage device 100 may be implemented at least in part in the form of software code.

The external memory 302 may comprise electronic memory such as random access memory (RAM) or read-only memory (ROM), in any combination. For example, the external memory 302 may be implemented at least in part as a double data rate (DDR) synchronous dynamic RAM (SDRAM). The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, bus 306 and preamplifier 308. Alternatively, portions of the processor 300, memory 302, bus 306 and preamplifier 308 may be implemented at least in part in the form of one or more additional integrated circuits, such as otherwise conventional integrated circuits designed for use in an HDD and suitably modified to implement interface circuitry as disclosed herein. An example of an SOC integrated circuit that may be modified for use in embodiments of the invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an integrated circuit implementation of an embodiment of the invention, multiple integrated circuit dies may be formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of this invention.

Although shown as part of the storage device 100 in the present embodiment, the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

The SOC 304 in the present embodiment includes interfaces 314 that communicate with interfaces 320 in the preamplifier 308. The interfaces 314 and 320 may be viewed as examples of what are more generally referred to herein as "interface circuitry." These interfaces may include, for example, one or more write interfaces over which write signals are provided to the preamplifier 308 from the SOC 304, and one or more read interfaces over which read signals are provided to the SOC 304 from the preamplifier 308. It is to be appreciated, however, that the disclosed techniques are not limited to such write and read interfaces, and may be adapted for use with a wide variety of other types of interfaces.

The interfaces 320 of the preamplifier 308 in the present embodiment comprise a write driver 322 and an associated adaptive power supply 324. The write driver 322 may be viewed as an example of what is more generally referred to herein as "driver circuitry." Such driver circuitry comprises at least one data path, and may more typically comprise at least two data paths, including a high side data path and a low side data path. It should be noted in this regard that the term "data path" as used herein is intended to be broadly construed, so as to encompass, for example, CMOS circuitry or other types of circuitry through which a data signal passes in a component of a storage device or other processing device.

The adaptive power supply 324 is configured to provide at least one variable supply voltage to at least one particular data path of the write driver 322. As will be described, the adaptive power supply 324 comprises a reference voltage circuit having a plurality of field effect transistors collectively configured to provide a variable reference voltage for the adaptive power supply, wherein different ones of the field effect transistors are biased into different operating regions. These field effect transistors may more particularly comprise p-type transistors P1A/P1B, P2A/P2B and P3A/P3B and n-type transistors N1A/N1B, N2A/N2B and N3A/N3B, as shown in FIG. 5. These field effect transistors may be implemented as metal-oxide-semiconductor (MOS) transistors, although other types and arrangements of field effect transistors may be used in other embodiments.

In the present embodiment, a first subset of the field effect transistors are biased into a linear region of operation and a second subset of the field effect transistors are biased into a saturation region of operation. The first subset of field effect transistors biased into the linear region of operation are configured such that the variable reference voltage tracks variations in on-resistance of one or more corresponding field effect transistors of the data path of the write driver 322. The second subset of the field effect transistors biased into the saturation region of operation are configured such that the variable reference voltage tracks variations in threshold voltage of one or more corresponding field effect transistors of the data path of the write driver 322.

The write driver 322 and adaptive power supply 324 will be described in greater detail below in conjunction with FIGS. 4 and 5, respectively. It should be noted that the write driver 322 as illustrated in FIG. 4 comprises both high side and low side data paths. Accordingly, the adaptive power supply 324 in the present embodiment comprises two separate supplies 324A and 324B, as illustrated in FIGS. 5A and 5B, respectively. The FIG. 5A adaptive power supply 324A is used to supply a variable supply voltage VP15_VSS to the low side data path, and the FIG. 5B adaptive power supply 324B is used to supply a variable supply voltage VN15_VCC to the high side data path.

Figure 5A:
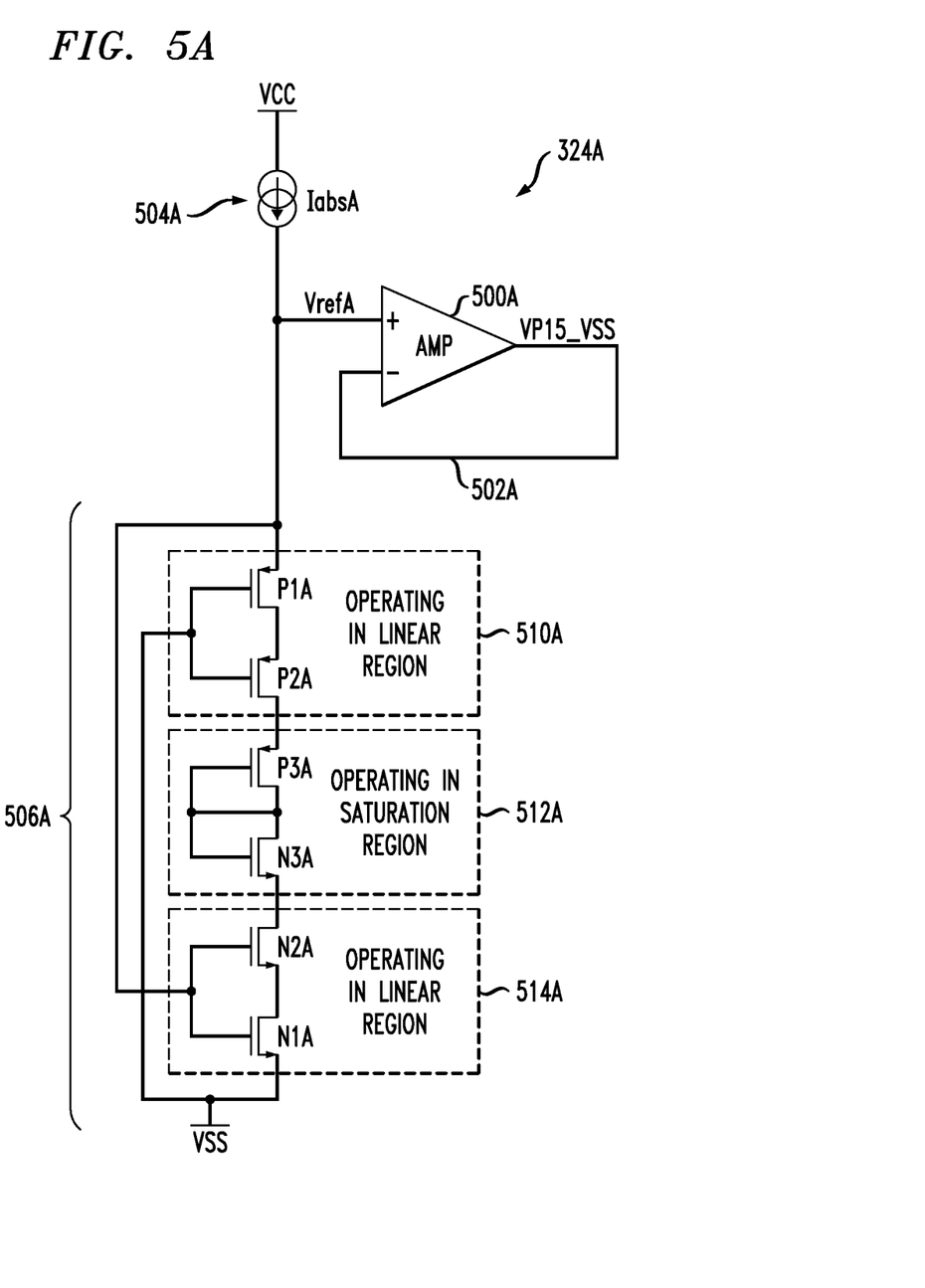
FIGS. 5A and 5B are schematic diagrams showing respective adaptive power supplies that may be utilized in the preamplifier of FIG. 3. These figures are collectively referred to herein as FIG. 5.
Figure 5B:
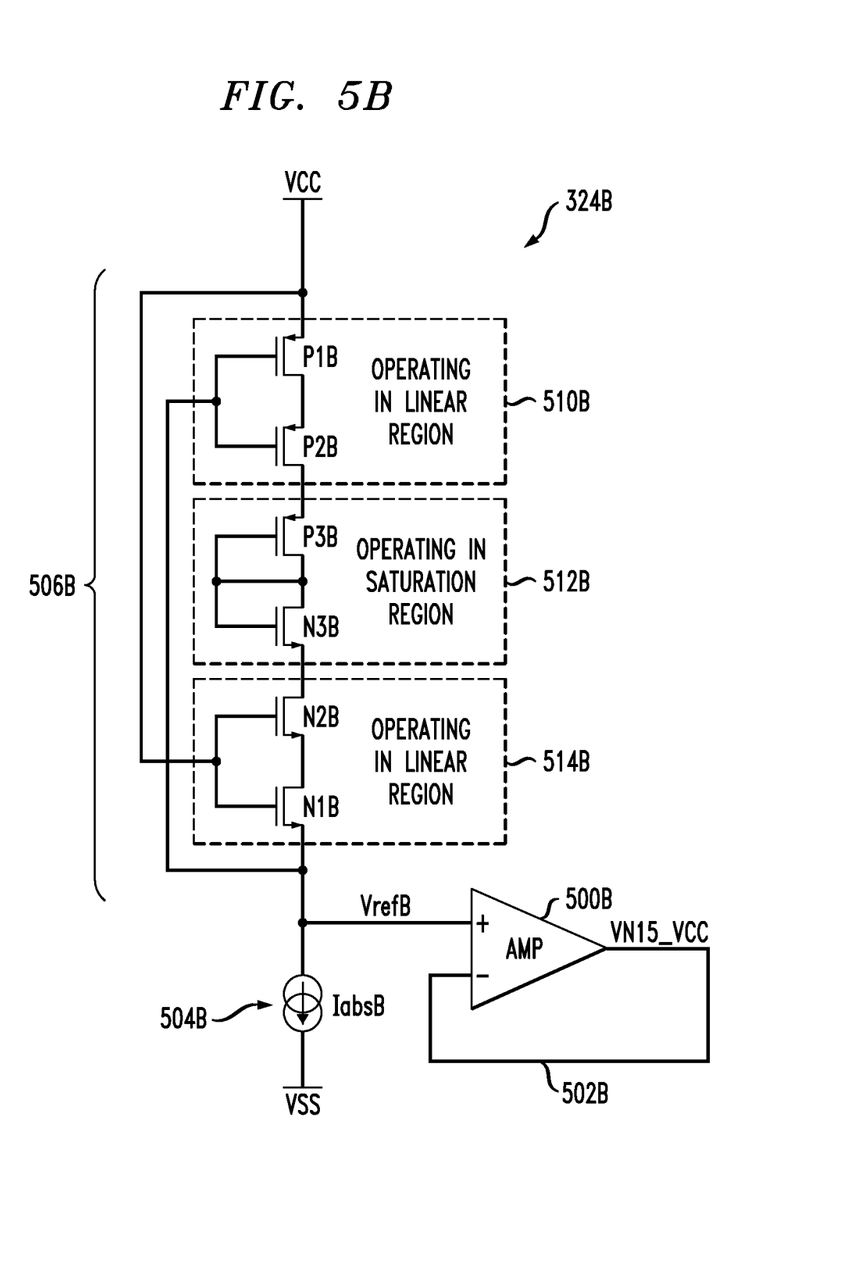

The term "adaptive power supply" as used herein should therefore be understood to encompass, by way of example, a single supply as in either FIG. 5A or FIG. 5B, or multiple supplies comprising the collective circuitry of FIGS. 5A and 5B.

The variable supply voltage VP15_VSS generally denotes approximately 1.5 volts up from VSS and the variable supply voltage VN15_VCC generally denotes approximately 1.5 volts down from VCC. The nominal value of 1.5 volts can vary in a range, for example, between about 1.2 volts and 1.6 volts.

Figure 4:
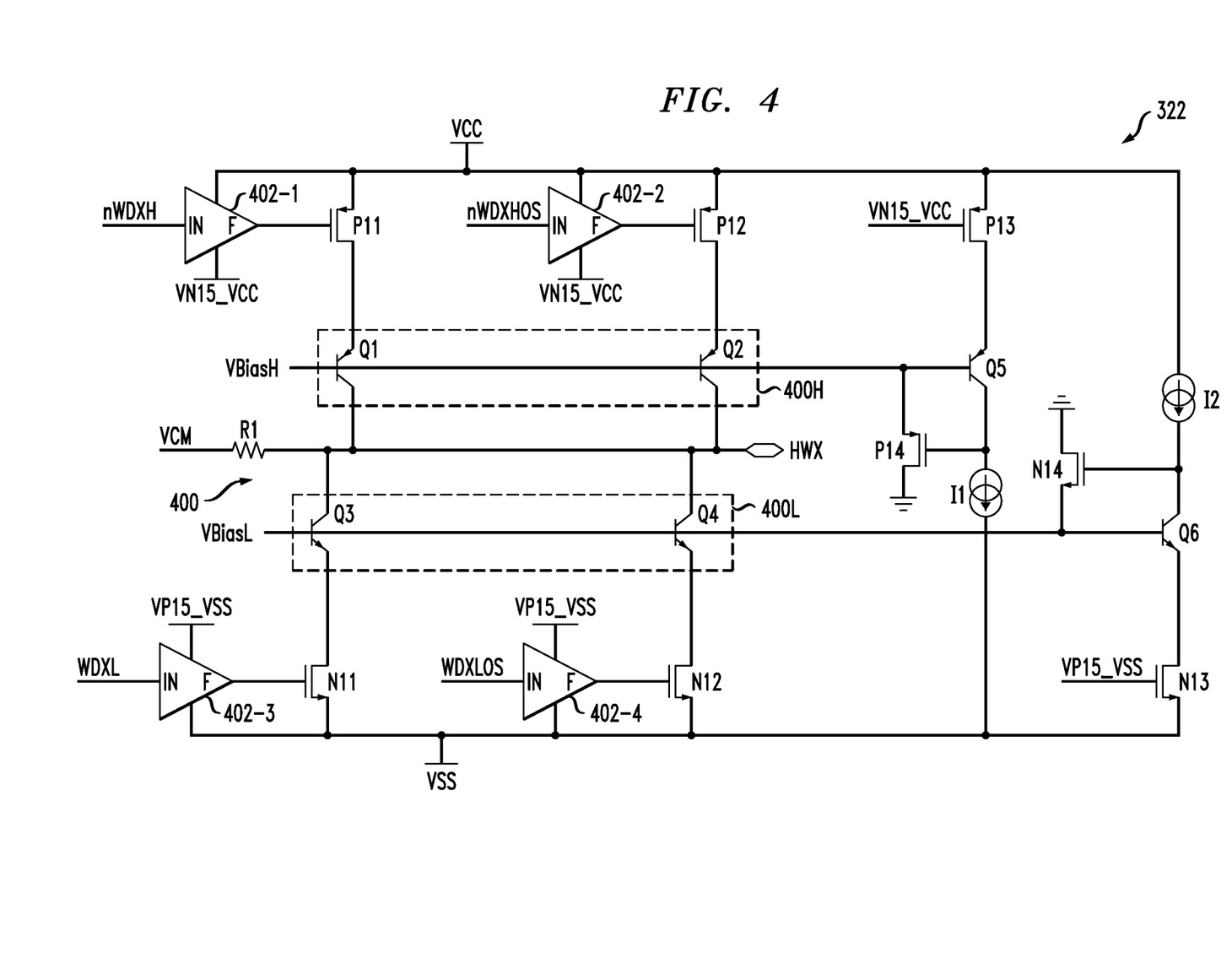
FIG. 4 is a schematic diagram showing the write driver data paths and other interface circuitry of the preamplifier of FIG. 3.

Referring now to FIG. 4, the write driver 322 in this embodiment comprises driver circuitry 400 including a high side driver 400H and a low side driver 400L. The high side driver 400H comprises p-n-p bipolar transistors Q1 and Q2 which receive a bias signal VBiasH at their respective base terminals. Transistor Q1 is utilized to drive normal high side write pulses while transistor Q2 is utilized to drive overshoot for those high side write pulses. The low side driver 400L comprises n-p-n bipolar transistors Q3 and Q4 which receive a bias signal VBiasL at their respective base terminals. Transistor Q3 is utilized to drive normal low side write pulses while transistor Q4 is utilized to drive overshoot for those low side write pulses. The collectors of the transistors Q1, Q2, Q3 and Q4 are tied together and are coupled via resistor R1 to a common mode voltage VCM. The data output of the write driver is provided at the node HWX.

The value of R1 may be selected to match a transmission line characteristic impedance Z0 as seen at the write driver output HWX, in order to eliminate reflections that might otherwise result from impedance mismatch. Suitable values for R1 may be in the range from about 12 ohms to 30 ohms, although other values can be used. The common mode voltage VCM utilized in this embodiment may be, for example, (VCC+VSS)/2. Another possible value for the common mode voltage VCM is (VCC-VSS)/2+VSS.

The write driver 322 further comprises a high side data path and a low side data path, each including a normal pulse portion and an overshoot portion.

In the high side data path, separate CMOS buffers 402-1 and 402-2 are associated with respective normal and overshoot portions of the path. The buffers 402-1 and 402-2 receive at their respective inputs the high side write data and write data overshoot signals denoted nWDXH and nWDXOS, respectively, where H generally denotes the high side data path and OS denotes overshoot.

The outputs of the buffers 402-1 and 402-2 drive the gates of respective p-type MOS field effect transistors P11 and P12, which have their sources coupled to an upper supply voltage VCC and their drains coupled to the emitters of Q1 and Q2, respectively. The buffers 402-1 and 402-2 each receive the variable supply voltage VN15_VCC from the adaptive power supply 324B of FIG. 5B. More particularly, this instance of the adaptive power supply 324 is configured to provide the variable supply voltage VN15_VCC to a lower supply terminal of each of the buffers 402-1 and 402-2 of the high side data path. The upper supply terminals of the buffers 402-1 and 402-2 are coupled to the upper supply voltage VCC.

In the low side data path, separate CMOS buffers 402-3 and 402-4 are associated with respective normal and overshoot portions of the path. The buffers 402-3 and 402-4 receive at their respective inputs the low side write data and write data overshoot signals denoted WDXL and WDXLOS, respectively, where L generally denotes the low side data path and OS again denotes overshoot.

The outputs of the buffers 402-3 and 402-4 drive the gates of respective n-type MOS transistors N11 and N12, which have their sources coupled to a lower supply voltage VSS and their drains coupled to the emitters of Q3 and Q4, respectively. The buffers 402-3 and 402-4 each receive the variable supply voltage VP15_VSS from the adaptive power supply 324A of FIG. 5A. More particularly, this instance of the adaptive power supply 324 is configured to provide the variable supply voltage VP15_VSS to an upper supply terminal of each of the buffers 402-3 and 402-4 of the low side data path. The lower supply terminals of the buffers 402-3 and 402-4 are coupled to the lower supply voltage VSS.

Each of the buffers 402 generally comprises a CMOS inverter chain, and may be viewed as an example of what is more generally referred to herein as "CMOS circuitry" of a given data path. Each inverter chain as illustrated in the figure has an input denoted IN and an output denoted F.

The write driver 322 in the FIG. 4 embodiment further comprises high side and low side bias circuitry for providing the respective bias voltages VBiasH and VBiasL.

The high side bias circuitry comprises an additional p-n-p bipolar transistor Q5 having its base coupled to the bases of Q1 and Q2, a current source I1 coupled between the lower supply voltage VSS and the collector of Q5, and first and second additional p-type MOS transistors P13 and P14. The gate of P13 is coupled to the variable supply voltage VN15_VCC, the source of P13 is coupled to the upper supply voltage VCC, and the drain of P13 is coupled to the emitter of Q5. The gate of P14 is coupled to the collector of Q5, and the source of P14 is coupled to the base of Q5. The drain of P14 is coupled to ground potential.

The low side bias circuitry comprises an additional n-p-n bipolar transistor Q6 having its base coupled to the bases of Q3 and Q4, a current source I2 coupled between the upper supply voltage VCC and the collector of Q6, and first and second additional n-type MOS transistors N13 and N14. The gate of N13 is coupled to the variable supply voltage VP15_VSS, the source of N13 is coupled to the lower supply voltage VSS, and the drain of N13 is coupled to the emitter of Q6. The gate of N14 is coupled to the collector of Q6, and the source of N14 is coupled to the base of Q6. The drain of N14 is coupled to ground potential.

It should be noted that the write driver 322 as illustrated in FIG. 4 may be part of a larger write driver that includes another set of the circuitry shown. Thus, by way of example, the circuitry shown in FIG. 4 may represent an X side of a write driver that also includes a Y side. The full write driver in such an arrangement may therefore comprise another set of the FIG. 4 circuitry, but having input signals denoted WDYL, WDYLOS, nWDYH, and nWDYHOS, where WDYL and nWDYH are opposite in polarity relative to WDXL and nWDXH, and where WDYLOS and nWDYHOS are driven similarly to the X side versions of these signals but on opposite write cycles. Numerous alternative arrangements of circuitry are possible in other write driver embodiments.

FIGS. 5A and 5B show the respective adaptive power supplies 324A and 324B for generating the respective variable supply voltages VP15_VSS and VN15_VCC for application to the low side and high side buffers in the write driver 322.

Referring initially to FIG. 5A, the adaptive power supply 324A in this embodiment comprises operational amplifier 500A, feedback path 502A, current source 504A and reference voltage circuit 506A.

The operational amplifier 500A has a non-inverting input (+) and an inverting input (−). The non-inverting input of the operational amplifier 500A is coupled to a variable reference voltage terminal VrefA of the reference voltage circuit 506A. The output of the operational amplifier provides the variable supply voltage VP15_VSS to the low side data path of write driver 322 and is coupled via feedback path 502A to the inverting input of the operational amplifier. The current provided by the current source 504A is denoted as an absolute current IabsA. In one embodiment, an absolute current of about 150 microamperes (μA) may be used to provide a nominal value for reference voltage VrefA of about 1.46 volts above VSS at typical process and temperature values.

The reference voltage circuit 506A in the present embodiment comprises a plurality of field effect transistors P1A, P2A, P3A and N1A, N2A, N3A arranged in a transistor stack between the variable reference voltage terminal VrefA and the lower supply terminal VSS of the adaptive power supply 324A. The transistors P1A, P2A, P3A and N1A, N2A, N3A are collectively configured to provide the variable reference voltage VrefA for the adaptive power supply 324A, and different ones of these transistors are biased into different operating regions, as illustrated in the figure. More particularly, p-type transistors P1A and P2A of transistor pair 510A and n-type transistors N1A and N2A of transistor pair 514A are all biased into a linear region of operation, and p-type transistor P3A and n-type transistor N3A of transistor pair 512A are both biased into a saturation region of operation.

As indicated previously, the transistors 510A and 514A that are biased into the linear region of operation are configured such that the variable reference voltage VrefA tracks variations in on-resistance of one or more corresponding field effect transistors of the low side data path of the write driver 322. The transistors 512A that are biased into the saturation region of operation are configured such that the variable reference voltage VrefA tracks variations in threshold voltage of one or more corresponding field effect transistors of the low side data path of the write driver 322. Thus, the reference voltage circuit 506A tracks both on-resistance and threshold voltage of corresponding transistors in the low side data path of the write driver 322.

The "corresponding transistors" as used herein may comprise, for example, transistors of the same conductivity type in one or more of the buffers 402 or other CMOS circuitry of the high side or low side data path. The transistors in the CMOS buffers 402 generally operate in linear and saturation regions at different times, during respective steady state and transition portions of a given signal, while the degeneration MOS operate in the linear region. Thus, the reference voltage circuit 506A includes transistors biased into linear regions and others biased into saturation regions.

In the reference voltage circuit 506A, the transistor stack more particularly comprises first p-type transistor P1A having its source coupled to the variable reference voltage terminal VrefA, second p-type transistor P2A having its source coupled to a drain of P1A and its gate coupled to a gate of P1A and to the lower supply terminal VSS, and third p-type transistor P3A having its source coupled to the drain of P2A and its gate coupled to its drain. The transistor stack further comprises first n-type transistor N1A having its source coupled to the lower supply terminal VSS, second n-type transistor N2A having its source coupled to a drain of N1A and its gate coupled to a gate of N1A and to the variable reference voltage terminal VrefA, and third n-type transistor N3A having its source coupled to the drain of N2A and its gate coupled to its drain and further having its gate coupled to the gate and drain of the third p-type transistor P3A. As mentioned above, the first and second p-type and n-type field effect transistors NA, P2A, N1A and N2A are all biased into the linear region of operation and the third p-type and n-type transistors P3A and N3A are biased into the saturation region of operation.

Referring now to FIG. 5B, the adaptive power supply 324B in this embodiment comprises operational amplifier 500B, feedback path 502B, current source 504B and reference voltage circuit 506B.

The operational amplifier 500B has a non-inverting input (+) and an inverting input (−). The non-inverting input of the operational amplifier 500B is coupled to a variable reference voltage terminal VrefB of the reference voltage circuit 506B. The output of the operational amplifier provides the variable supply voltage VN15_VCC to the high side data path of write driver 322 and is coupled via feedback path 502B to the inverting input of the operational amplifier. The current provided by the current source 504B is denoted as an absolute current IabsB. In one embodiment, an absolute current of about 150 μA may be used to provide a nominal value for reference voltage VrefB of about 1.46 volts below VCC at typical process and temperature values.

The reference voltage circuit 506B in the present embodiment comprises a plurality of field effect transistors P1B, P2B, P3B and N1B, N2B, N3B arranged in a transistor stack between the variable reference voltage terminal VrefB and the upper supply terminal VCC of the adaptive power supply 324B. The transistors P1B, P2B, P3B and N1B, N2B, N3B are collectively configured to provide the variable reference voltage VrefB for the adaptive power supply 324B, and different ones of these transistors are biased into different operating regions, as illustrated in the figure. More particularly, p-type transistors P1B and P2B of transistor pair 510B and n-type transistors N1B and N2B of transistor pair 514B are all biased into a linear region of operation, and p-type transistor P3B and n-type transistor N3B of transistor pair 512B are both biased into a saturation region of operation.

As indicated previously, the transistors 510B and 514B that are biased into the linear region of operation are configured such that the variable reference voltage VrefB tracks variations in on-resistance of one or more corresponding field effect transistors of the high side data path of the write driver 322. The transistors 512B that are biased into the saturation region of operation are configured such that the variable reference voltage VrefB tracks variations in threshold voltage of one or more corresponding field effect transistors of the high side data path of the write driver 322. Thus, the reference voltage circuit 506B tracks both on-resistance and threshold voltage of corresponding transistors in the high side data path of the write driver 322.

The configuration of the reference voltage circuit 506B in FIG. 5B is generally the same as that of the reference voltage circuit 506A in FIG. 5A.

Exemplary device sizes for the p-type transistors P1A/P1B, P2A/P2B and P3A/P3B and the n-type transistors N1A/N1B, N2A/N2B and N3A/N3B in the adaptive power supplies 324A and 324B of FIGS. 5A and 5B are given in the following table, although other device sizes may be used in other embodiments. The device sizes are given in terms of width and length in micrometers (µm). These width and length values are for a 0.16 µm CMOS process technology, and assume a nominal reference voltage of approximately 1.46 volts. The device sizes used in a given embodiment may vary based on selected process technology, nominal reference voltage and other factors.

| Interface Circuitry Device Sizes | | |
|---|---|---|
| Device | W (µm) | L (µm) |
| P1A/P1B | 2.50 | 0.16 |
| P2A/P2B | 2.50 | 0.16 |
| P3A/P3B | 5.00 | 0.16 |
| N1A/N1B | 2.45 | 0.16 |
| N2A/N2B | 2.45 | 0.16 |
| N3A/N3B | 4.90 | 0.16 |

The interface circuitry arrangements illustrated in FIGS. 4 and 5 dynamically track both on-resistance and threshold voltage of field effect transistors in the CMOS circuitry of the high side and low side data paths, such as the buffers 402, thereby allowing the write driver to more easily pass very narrow pulse widths, including, by way of example, 130 picosecond pulse widths that may be utilized for write pulse overshoot. This enhanced ability to pass narrow pulse widths may be achieved in the present embodiments without the need for any increase in the size of the CMOS inverters utilized in the datapath buffers 402, and thereby without significantly increasing the required circuit area or power consumption of the preamplifier 308. It should also be noted that under nominal operating conditions the variable supply voltages provided by the adaptive power supplies 324A and 324B can be reduced relative to that provided in conventional arrangements using fixed reference voltage circuits, resulting in a reduction in nominal power consumption relative to the conventional arrangements.

Other significant improvements provided in one or more embodiments of the present invention relative to conventional arrangements may include more stable write driver output impedance and therefore higher output current accuracy, as well as increased driver headroom, reduced propagation delay and reduced frequency dependent power fluctuation, over PVT variations.

It is to be appreciated that the particular interface circuitry arrangements shown in FIGS. 4 and 5 are presented by way of example only, and other embodiments of the invention may utilize other types of circuitry to implement write driver data paths and associated adaptive power supplies. It should be noted that multiple data paths can be powered by the same adaptive power supply.

In other embodiments, different numbers and arrangements of n-type and p-type transistors may be used in the transistor stack 506 of the adaptive power supply 324. For example, the transistor stack may comprise only n-type transistors, or only p-type transistors, as well as numerous other arrangements. However, both n-type and p-type transistors are used in order to allow the reference voltage to track PVT variations in n-type and p-type transistors of the high-speed CMOS circuitry of the write driver.

It should be noted in this regard that since the CMOS circuitry in the FIG. 4 write driver comprises both p-type and n-type transistors, the reference voltage circuit 506 may be configured to track each transistor type weighted by how much that transistor type varies over PVT and contributes to speed variation in the CMOS circuitry.

For example, if in a given embodiment the speed variation is a substantially even contribution of both p-type and n-type transistor variations, a substantially even arrangement of p-type and n-type transistors may be used in the reference voltage circuit. However, if the majority of the speed variation is due to the n-type transistors in the CMOS circuitry, the reference voltage circuit may be configured such that it includes only n-type transistors so as to track only n-type transistor drive strength characteristics of the CMOS circuitry. As another example, if 80% of the speed variation in the CMOS circuitry is due to p-type transistors and 20% is due to n-type transistors, the reference voltage circuit may be configured to track p-type transistor drive strength characteristics more heavily than the n-type drive strength characteristics, ideally by a factor of 80% to 20%.

As mentioned previously, the storage device configuration can be varied in other embodiments. For example, the storage device may comprise a hybrid HDD which includes a flash memory in addition to one or more storage disks. Also, interface circuitry as described herein is not limited to use in storage devices, and can be more generally implemented in other types of processing devices.

It is also to be appreciated that the particular storage disk configuration and recording mechanism can be varied in other embodiments of the invention. For example, recording techniques such as shingled magnetic recording (SMR) and bit-patterned media (BPM) can be used in one or more embodiments of the invention.

Figure 6:
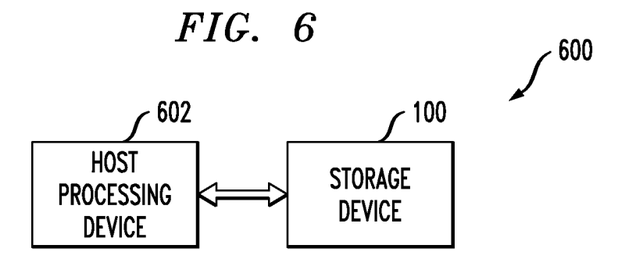
FIG. 6 illustrates interconnection of the storage device of FIG. 1 with a host processing device in a data processing system.

FIG. 6 illustrates a processing system 600 comprising the disk-based storage device 100 coupled to a host processing device 602, which may be a computer, server, communication device, etc. Although shown as a separate element in this figure, the storage device 100 may be incorporated into the host processing device. Instructions such as read commands and write commands directed to the storage device 100 may originate from the processing device 602, which may comprise processor and memory elements similar to those previously described in conjunction with FIG. 3.

Figure 7:
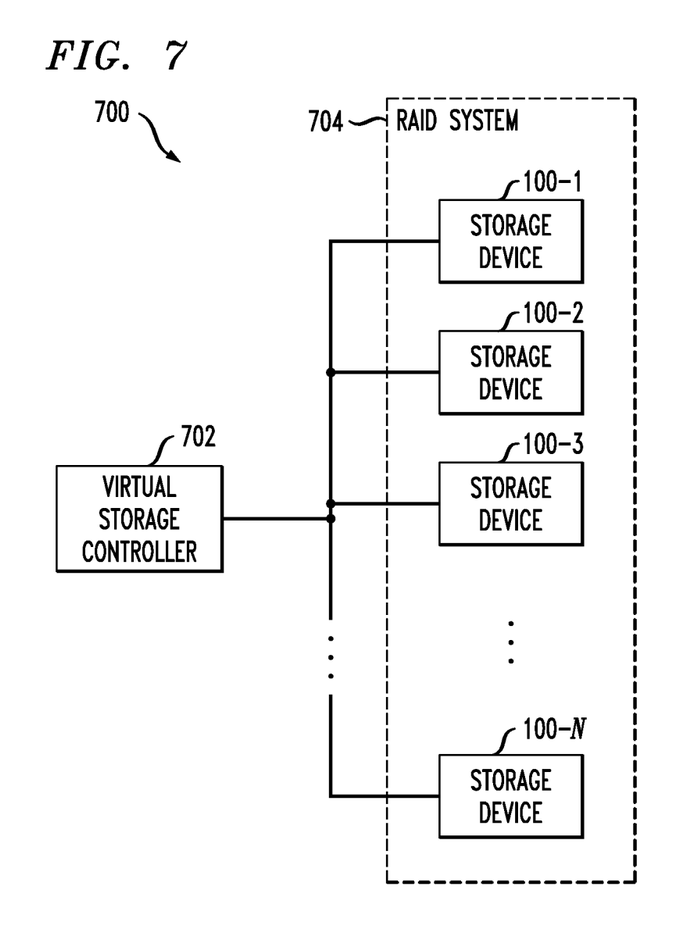
FIG. 7 shows a virtual storage system incorporating a plurality of disk-based storage devices of the type shown in FIG. 1.

Multiple disk-based storage devices 100 may be incorporated into a virtual storage system 700 as illustrated in FIG. 7. The virtual storage system 700, also referred to as a storage virtualization system, illustratively comprises a virtual storage controller 702 coupled to a RAID system 704, where RAID denotes Redundant Array of Independent Disks. The RAID system more specifically comprises N distinct storage devices denoted 100-1, 100-2, . . . 100-N, one or more of which are assumed to be configured to include interface circuitry comprising at least one data path and an associated adaptive power supply as disclosed herein.

These and other virtual storage systems comprising HDDs or other disk-based storage devices of the type disclosed herein are considered embodiments of the invention. The host processing device 602 in FIG. 6 may also be an element of a virtual storage system, and may incorporate the virtual storage controller 702.

Again, it should be emphasized that the above-described embodiments of the invention are intended to be illustrative only. For example, other embodiments can use different types and arrangements of control circuitry, interface circuitry and other storage device elements for implementing the described functionality. In addition, data paths and associated adaptive power supplies as disclosed herein can be implemented in a variety of other types of processing devices. Furthermore, the particular manner in which a data path and an associated adaptive power supply are configured, such as the manner in which particular transistor types are arranged in a reference voltage circuit of an adaptive power supply, may be varied in other embodiments. These and numerous other alternative embodiments within the scope of the following claims will be apparent to those skilled in the art.

What is claimed is:

1. An apparatus comprising:
    interface circuitry, the interface circuitry comprising at least one data path and an adaptive power supply configured to provide a variable supply voltage to said data path of the interface circuitry;
    wherein the adaptive power supply comprises a reference voltage circuit having a plurality of field effect transistors collectively configured to provide a variable reference voltage for the adaptive power supply, wherein different ones of the field effect transistors are biased into different operating regions.

2. The apparatus of claim 1 wherein a first subset of the field effect transistors are biased into a linear region of operation and a second subset of the field effect transistors are biased into a saturation region of operation.

3. The apparatus of claim 2 wherein the first subset of field effect transistors biased into the linear region of operation are configured such that the variable reference voltage tracks variations in on-resistance of one or more corresponding field effect transistors of the data path of the interface circuitry.

4. The apparatus of claim 2 wherein the second subset of the field effect transistors biased into the saturation region of operation are configured such that the variable reference voltage tracks variations in threshold voltage of one or more corresponding field effect transistors of the data path of the interface circuitry.

5. The apparatus of claim 1 wherein the reference voltage circuit comprises a plurality of n-type field effect transistors and a plurality of p-type field effect transistors collectively configured to provide the variable reference voltage for the adaptive power supply, wherein different ones of the n-type and p-type field effect transistors are biased into different operating regions.

6. The apparatus of claim 5 wherein a first subset of the n-type and p-type field effect transistors are biased into a linear region of operation and a second subset of the n-type and p-type field effect transistors are biased into a saturation region of operation.

7. The apparatus of claim 1 wherein the field effect transistors of the reference voltage circuit are arranged in a transistor stack between a variable reference voltage terminal and a supply terminal of the adaptive power supply.

8. The apparatus of claim 7 wherein the adaptive power supply further comprises an operational amplifier having first and second inputs and an output, with the first input coupled to the variable reference voltage terminal of the reference voltage circuit, and the output providing the variable supply voltage to the data path of the interface circuitry and being coupled via a feedback path to the second input of the operational amplifier.

9. The apparatus of claim 7 wherein the field effect transistors of the reference voltage circuit comprise:
    a first p-type field effect transistor having its source coupled to one of the variable reference voltage terminal and the supply terminal;
    a second p-type field effect transistor having its source coupled to a drain of the first p-type field effect transistor and its gate coupled to a gate of the first p-type field effect transistor and to the other of the variable reference voltage terminal and the supply terminal; and
    a third p-type field effect transistor having its source coupled to the drain of the second p-type field effect transistor and its gate coupled to its drain;
    wherein the first and second p-type field effect transistors are biased into the linear region of operation and the third p-type field effect transistor is biased into the saturation region of operation.

10. The apparatus of claim 7 wherein the field effect transistors of the reference voltage circuit comprise:
    a first n-type field effect transistor having its source coupled to one of the variable reference voltage terminal and the supply terminal;
    a second n-type field effect transistor having its source coupled to a drain of the first n-type field effect transistor and its gate coupled to a gate of the first n-type field effect transistor and to the other of the variable reference voltage terminal and the supply terminal; and
    a third n-type field effect transistor having its source coupled to the drain of the second n-type field effect transistor and its gate coupled to its drain;
    wherein the first and second n-type field effect transistors are biased into the linear region of operation and the third n-type field effect transistor is biased into the saturation region of operation.

11. The apparatus of claim 7 wherein the field effect transistors of the reference voltage circuit comprise:
    a first p-type field effect transistor having its source coupled to one of the variable reference voltage terminal and the supply terminal;
    a second p-type field effect transistor having its source coupled to a drain of the first p-type field effect transistor and its gate coupled to a gate of the first p-type field effect transistor and to the other of the variable reference voltage terminal and the supply terminal;
    a third p-type field effect transistor having its source coupled to the drain of the second p-type field effect transistor and its gate coupled to its drain;
    a first n-type field effect transistor having its source coupled to one of the variable reference voltage terminal and the supply terminal;
    a second n-type field effect transistor having its source coupled to a drain of the first n-type field effect transistor and its gate coupled to a gate of the first n-type field effect transistor and to the other of the variable reference voltage terminal and the supply terminal; and
    a third n-type field effect transistor having its source coupled to the drain of the second n-type field effect transistor and its gate coupled to its drain and further having its gate coupled to the gate and drain of the third p-type field effect transistor;
    wherein the first and second p-type and n-type field effect transistors are biased into the linear region of operation and the third p-type and n-type field effect transistor are biased into the saturation region of operation.

12. The apparatus of claim 1 wherein the interface circuitry comprises driver circuitry and the data path comprises one of a high side data path and a low side data path of the driver circuitry.

13. The apparatus of claim 12 wherein the adaptive power supply is configured to provide the variable supply voltage to a lower supply terminal of CMOS circuitry of the high side data path.

14. The apparatus of claim 12 wherein the adaptive power supply is configured to provide the variable supply voltage to an upper supply terminal of CMOS circuitry of the low side data path.

15. The apparatus of claim 12 wherein the adaptive power supply is configured to provide a first variable supply voltage to a lower supply terminal of the high side data path utilizing a first reference voltage circuit having a plurality of field effect transistors collectively configured to provide a first variable reference voltage for the adaptive power supply, wherein different ones of the field effect transistors of the first reference voltage circuit are biased into different operating regions, and wherein the adaptive power supply is further configured to provide a second variable supply voltage to an upper supply terminal of the low side data path utilizing a second reference voltage circuit having a plurality of field effect transistors collectively configured to provide a second variable reference voltage for the adaptive power supply, wherein different ones of the field effect transistors of the second reference voltage circuit are biased into different operating regions.

16. An integrated circuit comprising the apparatus of claim 1.

17. A method comprising the steps of:
configuring interface circuitry to include at least one data path; and
generating a variable supply voltage for the data path of the interface circuitry based on a reference voltage circuit having a plurality of field effect transistors collectively configured to provide a variable reference voltage;
wherein different ones of the field effect transistors are biased into different operating regions.

18. The method of claim 17 wherein the generating step further comprises the steps of:
biasing a first subset of the field effect transistors into a linear region of operation such that the variable reference voltage tracks variations in on-resistance of one or more corresponding field effect transistors of the data path of the interface circuitry; and
biasing a second subset of the field effect transistors into a saturation region of operation such that the variable reference voltage tracks variations in on-resistance of said one or more corresponding field effect transistors of the data path of the interface circuitry.

19. A storage device comprising:
a read/write head configured to read data from and write data to a storage medium;
control circuitry configured to process data received from and supplied to the read/write head; and
interface circuitry coupled between the read/write head and the control circuitry;
wherein the interface circuitry comprises:
at least one data path; and
an adaptive power supply configured to provide a variable supply voltage to said data path;
wherein the adaptive power supply comprises a reference voltage circuit having a plurality of field effect transistors collectively configured to provide a variable reference voltage for the adaptive power supply; and
wherein different ones of the field effect transistors are biased into different operating regions.

20. The storage device of claim 19 wherein the interface circuitry comprises driver circuitry implemented at least in part within a preamplifier of the storage device.

21. A virtual storage system comprising the storage device of claim 19.

* * * * *